United States Patent [19]

Weber et al.

[11] Patent Number: 4,524,122
[45] Date of Patent: Jun. 18, 1985

[54] SUBSTITUTED 4-NITROPHENYLAZO-1-NAPHTHOL CYAN DYES HAVING IMPROVED LIGHT STABILITY

[75] Inventors: Lynda D. Weber; Paul B. Merkel, both of Rochester; Harold C. Warren, III, Rush, all of N.Y.

[73] Assignee: Eastman Kodak Company, Rochester, N.Y.

[21] Appl. No.: 654,598

[22] Filed: Sep. 26, 1984

[51] Int. Cl.$^3$ .......................... G03C 5/54; G03C 1/40
[52] U.S. Cl. ................................. 430/223; 430/222; 430/562
[58] Field of Search ............... 430/222, 223, 225, 226, 430/562

[56] References Cited

U.S. PATENT DOCUMENTS

| | | | |
|---|---|---|---|
| 3,942,987 | 3/1976 | Landholm et al. | 430/223 |
| 4,013,635 | 3/1977 | Landholm et al. | 430/223 |
| 4,195,993 | 4/1980 | Kilminster et al. | 430/223 |
| 4,268,625 | 5/1981 | Fujita et al. | 430/223 |

Primary Examiner—Richard L. Schilling
Attorney, Agent, or Firm—Harold E. Cole

[57] ABSTRACT

Photographic elements and diffusion transfer assemblages employing a nondiffusible compound capable of releasing at least one diffusible cyan dye moiety, and having the formula:

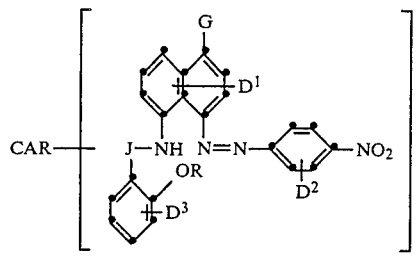

wherein:

(a) J represents $SO_2$ or CO,
(b) R represents a substituted or unsubstituted alkyl group of from 1 to about 10 carbon atoms or a substituted or unsubstituted aryl group of from 6 to about 12 carbon atoms,
(c) G represents a hydroxy group, a salt thereof, or a hydrolyzable precursor thereof,
(d) CAR represents a ballasted carrier moiety, and
(e) $D^1$, $D^2$, and $D^3$ each independently represents H or one or more electron-withdrawing groups selected from $-SO_2Y^1$, $-CONY^1Y^2$, $-Cl$, $-COY^1$, $-C\equiv N$ and $-SO_2NY^1Y^2$, where $Y^1$ and $Y^2$ each independently represents hydrogen, a substituted or unsubstituted alkyl group of from 1 to about 10 carbon atoms or a substituted or unsubstituted aryl group of from 6 to about 12 carbon atoms.

The released dyes have improved stability to light.

23 Claims, No Drawings

SUBSTITUTED 4-NITROPHENYLAZO-1-NAPHTHOL CYAN DYES HAVING IMPROVED LIGHT STABILITY

This invention relates to photography and more particularly to color diffusion transfer photography employing certain substituted, nondiffusible 4-nitrophenylazo-1-naphthol cyan dye-releasing compounds which, as a function of development of a silver halide emulsion layer, release a diffusible cyan dye. The released cyan dye has an improved stability to light.

U.S. Pat. No. 4,195,993 relates to 4-nitrophenylazo-1-naphthol cyan dye-releasing compounds having a 5-benzenesulfonamido substituent which may have a carboxy group in the benzene ring attached in the meta or para position to the sulfonamido group. There is no disclosure in this patent, however, of any substituent to be attached to the benzene ring in the ortho position to the sulfonamido group.

U.S. Pat. No. 3,942,987 also relates to 4-nitrophenylazo-1-naphthol cyan dye releasing compounds which may have a 5-benzenesulfonamido substituent thereon. In column 41, compound 28 is illustrated wherein the benzenesulfonamido substituent has two carboxy groups in the benzene ring, both attached in the meta position to the sulfonamido group. In column 4, there is a general disclosure for "R2" being an o-, m-, or p-phenylene which may be substituted with eleven different groups, including a methoxy group. There is no disclosure in this patent, however, that selecting a methoxy group, out of the eleven different groups disclosed, and locating it in the ortho position to the sulfonamido group will provide an improved stability to light.

U.S. Pat. Nos. 4,013,635, in column 3, and 4,268,625, in columns 5 and 6, are similar in their disclosure to U.S. Pat. No. 3,942,987, discussed above, insofar as containing a general disclosure of 4-nitrophenylazo-1-naphthol cyan dye-releasing compounds wherein the benzene ring of a 5-benzenesulfonamido substituent is substituted with various groups including a methoxy group. Again, however, there is no disclosure in these patents that selection of a methoxy group out of the different groups disclosed, and locating it in the ortho position to the sulfonamido group, will provide an improved stability to light. As will be shown by comparative tests hereinafter, groups other than a methoxy group do not provide the same beneficial effect, and even a methoxy group does not provide a beneficial effect unless it is located in the ortho position.

SUMMARY OF THE INVENTION

A photographic element in accordance with the invention comprises a support having thereon at least one photosensitive silver halide emulsion layer, the emulsion layer having associated therewith a dye image-providing material, and wherein the dye image-providing material is a nondiffusible compound capable of releasing at least one diffusible cyan dye moiety, the compound having the formula:

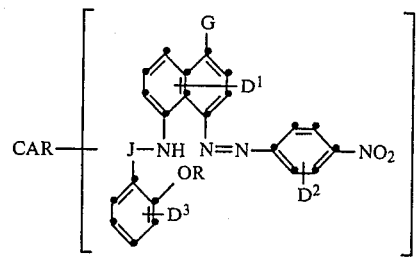

wherein:

(a) J represents $SO_2$ or CO, (b) R represents a substituted or unsubstituted alkyl group of from 1 to about 10 carbon atoms or a substituted or unsubstituted aryl group of from 6 to about 12 carbon atoms, (c) G represents a hydroxy group, a salt thereof, or a hydrolyzable precursor thereof, (d) CAR represents a ballasted carrier moiety capable of releasing the diffusible dye moiety as a function of development of the silver halide emulsion layer under alkaline conditions, and (e) $D^1$, $D^2$, and $D^3$ each independently represents H or one or more electron-withdrawing groups selected from $-SO_2Y^1$, $-CONY^1Y^2$, $-Cl$, $-COY^1$, $-C{\equiv}N$ and $-SO_2NY^1Y^2$, where $Y^1$ and $Y^2$ each independently represents hydrogen, a substituted or unsubstituted alkyl group of from 1 to about 10 carbon atoms or a substituted or unsubstituted aryl group of from 6 to about 12 carbon atoms.

DETAILED DESCRIPTION OF THE INVENTION

In a preferred embodiment of the invention, J represents $SO_2$, R represents an alkyl group of from 1 to about 10 carbon atoms and G represents hydroxy.

In another preferred embodiment, $D^1$ is H, $-CON(CH_3)(C_6H_5)$,

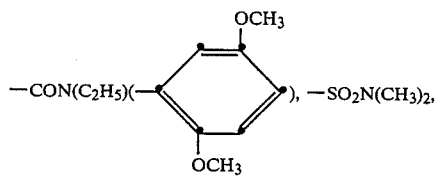

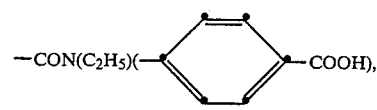

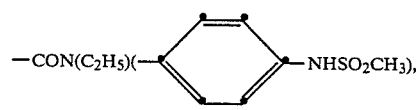

$-CON(C_2H_4OH)(C_6H_5)$, or

$D^2$ is $SO_2CH_3$ in the 2-position, and $D^3$ is H or $SO_2NH_2$ in the 5'-position.
In yet another preferred embodiment,
R is methyl,
$D^1$ is $-SO_2N(CH_3)_2$, $-CON(C_2H_4OH)(C_6H_5)$ or

in the 2-position,
$D^2$ is $SO_2CH_3$ in the 2-position, and
$D^3$ is $SO_2NH_2$ is the 5'-position.

Examples of the groups which R may represent include methyl, ethyl, isopropyl, pentyl, hexyl, decyl, phenyl, benzyl or phenethyl, any one of which may be substituted with various groups such as cyano, hydrogen, bromo, chloro, etc.

Examples of the groups which $Y^1$ and $Y^2$ may represent include hydrogen or any of the groups mentioned above for R.

In another embodiment of the invention, CAR may have attached thereto two azo dye moieties, as shown by the formula above, in which case two dye moieties will be released from one CAR moiety.

As stated above, G can be a hydroxy group, a salt thereof such as a sodium salt, a tetramethylammonium salt, etc., or a hydrolyzable precursor thereof. Hydrolyzable precursors of a hydroxy group which can be employed in this invention include acetate, benzoate, pivalate, carbamates, an acyloxy group having the formula $-OCOR^5$, $-OCOOR^5$ or $-OCON(R^5)_2$, wherein each $R^5$ is an alkyl group having 1 to about 8 carbon atoms, such as methyl, ethyl, isopropyl, butyl and the like, or an aryl group having 6 to about 12 carbon atoms, such as phenyl, etc., or any of the blocking groups which can be cleaved by an intramolecular nucleophilic displacement reaction, as disclosed in Mooberry and Archie U.S. Pat. No. 4,310,612, the disclosure of which is hereby incorporated by reference. CAR can also be attached to the compounds illustrated by the formula above through G.

Other substituents may also be present in the rings illustrated above, such as alkyl of 1 to 6 carbon atoms, acyl, aryl of 6 to 10 carbon atoms, aralkyl, alkylsulfonyl, amino, alkoxy, halogens such as chloro or bromo, morpholino, phenylsulfamoyl, solubilizing groups such as sulfonamido, sulfamoyl, carboxy, sulfo or hydrolyzable precursors thereof.

The 4-nitrophenylazo-1-naphthol cyan dye-releasing compounds of the invention have a 5-benzenesulfonamido or 5-carbonamido substituent, which in turn contains an ortho alkoxy or phenoxy group. This ortho alkoxy or phenoxy group is responsible for the improved stability to light of the compounds of the invention, as will be demonstrated hereinafter.

There is great latitude in selecting a CAR moiety which is attached to the dye-releasing compounds described above. Depending upon the nature of the ballasted carrier moiety selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550, 3,628,952, 3,227,552 and 3,844,785 (dye released by chromogenic coupling), U.S. Pat. Nos. 3,443,939 and 3,443,940 (dye released by intramolecular ring closure), U.S. Pat. Nos. 3,698,897 and 3,725,062 (dye released from hydroquinone derivatives), U.S. Pat. No. 3,728,113 (dye released from a hydroquinonylmethyl quaternary salt), U.S. Pat. Nos. 3,719,489 and 3,443,941 (silver ion induced dye release), British Patent Publication No. 2,017,950A (dye released by a dye bleach process), U.S. Pat. Nos. 4,053,312, 4,198,235, 4,179,231, 4,055,428 and 4,149,892 (dye released by oxidation and deamidation), and U.S. Pat. Nos. 3,245,789 and 3,980,497, Canadian Pat. No. 602,607, British Pat. No. 1,464,104, *Research Disclosure* 14447, April 1976, U.S. Pat. No. 4,139,379 of Chasman et al, U.S. Pat. No. 4,232,107 and European Patent Publication No. 12908 (dye released by miscellaneous mechanisms), the disclosures of which are hereby incorporated by reference.

In a further preferred embodiment of the invention, the ballasted carrier moiety or CAR as described above may be represented by the following formula:

(Ballast-Carrier-Link)— wherein:

(a) Ballast is an organic ballasting radical of such molecular size and configuration as to render said compound nondiffusible in said photographic element during development in an alkaline processing composition, (b) Carrier is an oxidizable acyclic, carbocyclic or heterocyclic moiety (see "*The Theory of the Photographic Process*", by C. E. K. Mees and T. H. James, Third Edition, 1966, pages 282 to 283), e.g., moieties containing atoms according to the following configuration:

$$a-(-C=C)_b-$$

wherein:
b is a positive integer of 1 to 2, and
a represents the radicals OH, SH, NH or hydrolyzable precursors thereof, and (c) Link represents a group which, upon oxidation of said Carrier moiety, is capable of being hydrolytically cleaved to release the diffusible azo dye. For example, Link may be the following groups:

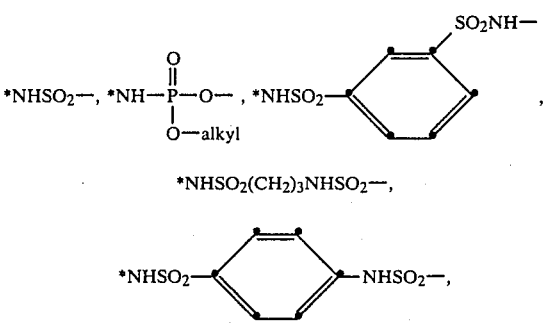

-continued

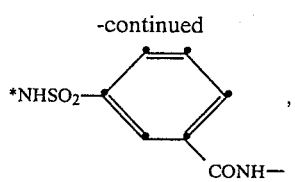

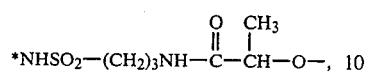

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms, a carbamoyl radical having 8 to 30 carbon atoms, such as —CONH(CH$_2$)$_4$—O—C$_6$H$_3$(C$_5$H$_{11}$)$_2$ or —CON(C$_{12}$H$_{25}$)$_2$, or a keto radical having 8 to 30 carbon atoms, such as —CO—C$_{17}$H$_{35}$ or —CO—C$_6$H$_4$(t—C$_{12}$H$_{25}$).

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formula is a group having the formula:

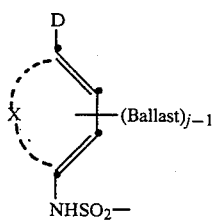

wherein:

(a) Ballast is an organic ballasting radical of such molecular size and configuration (e.g., simple organic groups or polymeric groups) as to render said compound nondiffusible in a photographic element during development in an alkaline processing composition;

(b) D is OR$^1$ or NHR$^2$ wherein R$^1$ is hydrogen or a hydrolyzable moiety, such as acetyl, mono-, di- or trichloroacetyl radicals, perfluoroacyl, pyruvyl, alkoxyacyl, nitrobenzoyl, cyanobenzoyl, sulfonyl or sulfinyl, and R$^2$ is hydrogen or a substituted or unsubstituted alkyl group of 1 to 22 carbon atoms, such as methyl, ethyl, hydroxyethyl, propyl, butyl, secondary butyl, tertbutyl, cyclopropyl, 4-chlorobutyl, cyclobutyl, 4-nitroamyl, hexyl, cyclohexyl, octyl, decyl, octadecyl, dodecyl, benzyl or phenethyl (when R$^2$ is an alkyl group of greater than 8 carbon atoms, it can serve as a partial or sole Ballast);

(c) X represents at least the atoms necessary to complete a benzene nucleus, a naphthalene nucleus, or a 5 to 7 membered heterocyclic ring, such as pyrazolone or pyrimidine; and (d) j is a positive integer of 1 to 2 and is 2 when D is OR$^1$ or when R$^2$ is hydrogen or an alkyl group of less than 8 carbon atoms.

Especially good results are obtained in the above formula when D is OH, j is 2, and X is a naphthalene nucleus.

Examples of the CAR moiety in this highly preferred embodiment are disclosed in U.S. Pat. Nos. 4,076,529, 3,993,638 and 3,928,312, the disclosures of which are hereby incorporated by reference, and include the following:

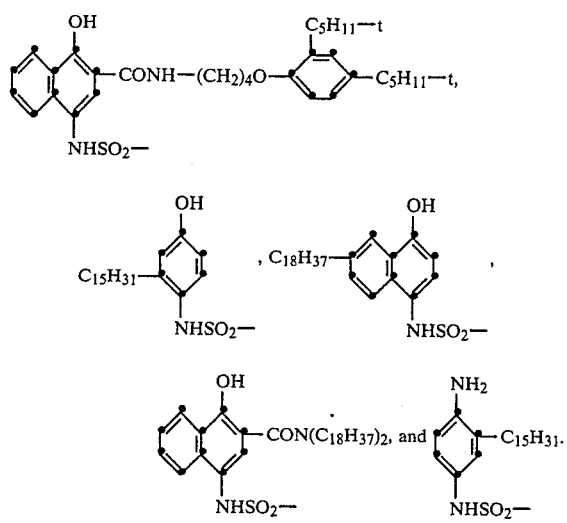

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

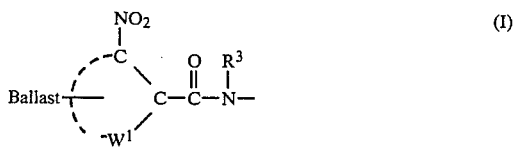

wherein:

Ballast is an organic ballasting radical of such molecular size and configuration as to render said compound nondiffusible in a photographic element during development in an alkaline processing composition, W$^1$ represents at least the atoms necessary to complete a benzene nucleus (including various substituents thereon), and R$^3$ is an alkyl (including substituted alkyl) radical having 1 to about 4 carbon atoms.

Examples of the CAR moiety in this formula (I) include the following:

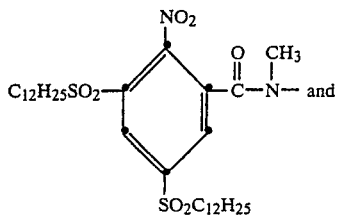

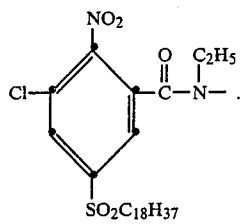

In a second embodiment of positive-working dye-release chemistry as referred to above, the ballasted carrier moiety or CAR in the above formulas may be a group having the formula:

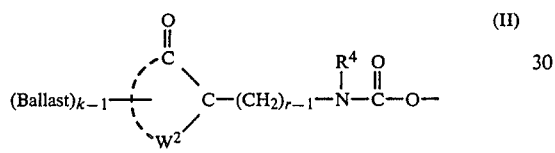

wherein:
Ballast is an organic ballasting radical of such molecular size and configuration as to render said compound nondiffusible in a photographic element during development in an alkaline processing composition, $W^2$ represents at least the atoms necessary to complete a quinone nucleus (including various substituents thereon), r is a positive integer of 1 or 2, $R^4$ is an alkyl (including substituted alkyl) radical having 1 to about 40 carbon atoms or an aryl (including substituted aryl) radical having 6 to about 40 carbon atoms, and k is a positive integer of 1 to 2 and is 2 when $R^4$ is a radical of less than 8 carbon atoms.

Examples of the CAR moiety in this formula (II) include the following:

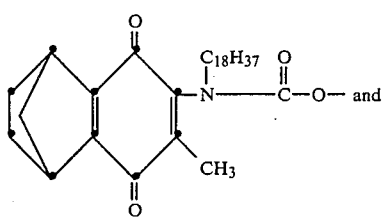

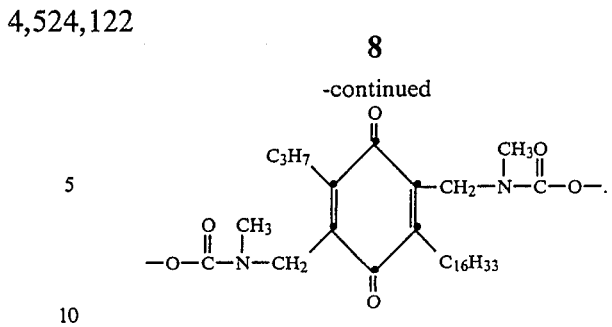

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

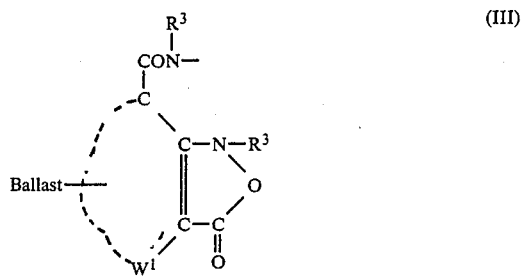

wherein:
Ballast, $W^1$ and $R^3$ are as defined for formula (I) above.

Examples of the CAR moiety in this formula (III) include the following:

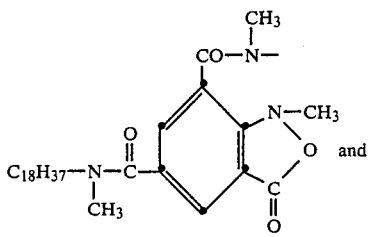

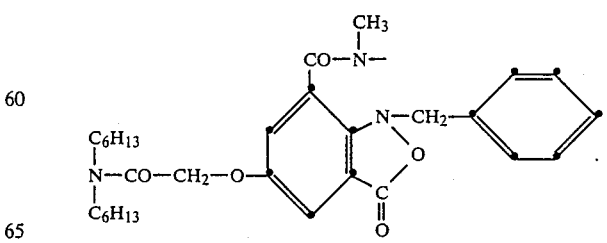

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

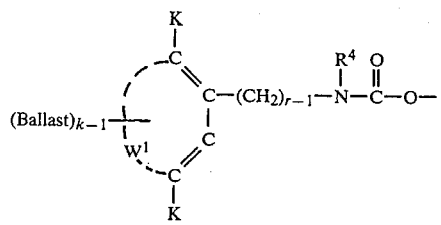
(IV)

wherein:
Ballast, r, $R^4$ and k are as defined for formula (II) above,
$W^1$ is as defined for formula (I) above, and
K is OH or a hydrolyzable precursor thereof.
Examples of the CAR moiety in this formula (IV) include the following:

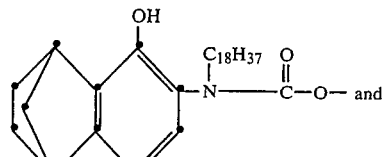

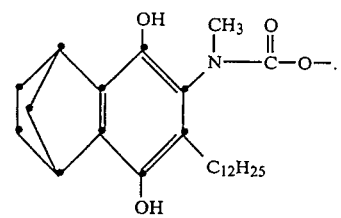

For further details concerning this particular CAR moiety, including synthesis details, reference is made to U.S. Pat. No. 3,980,479 of Fields et al, the disclosure of which is hereby incorporated by reference.

Representative compounds included within the scope of the invention include the following:

| Compound | R | $D^3$ | $D^2$ | $D^1$ | | $CAR^1$ |
|---|---|---|---|---|---|---|

![structure]

| 1 | $CH_3$ | H | H | $-CON\begin{smallmatrix}C_2H_5\\ \text{-phenyl-COOH}\end{smallmatrix}$ | | 5'-position |
| 2 | $CH_3$ | H | H | $-SO_2N(CH_3)_2$ | | 5'-position |
| 3 | $CH_3$ | H | H | $-CON\begin{smallmatrix}C_2H_5\\ \text{-phenyl-}NHSO_2CH_3\end{smallmatrix}$ | | 5'-position |
| 4 | $CH_3$ | H | H | $-CON\begin{smallmatrix}C_2H_4OH\\ \text{-phenyl}\end{smallmatrix}$ | | 5'-position |

-continued

| Compound | R | D³ | D² | D¹ | CAR¹ |
|---|---|---|---|---|---|
| 5 | CH₃ | H | H | -CON(CH₃)-C₆H₄-NHSO₂CH₃ | 5'-position |
| 6 | CH₃ | H | H | -CON(CH₃)-C₆H₄-NHSO₂CH₃ | 5'-position |
| 7 | CH₃ | 4'-Cl | H | -CON(CH₃)-C₆H₅ | 5'-position |
| 8 | CH₃ | H | H | -CON(CH₃)-C₆H₅ | 5'-position |
| 9 | CH(CH₃)₂ | H | H | -CON(CH₃)-C₆H₅ | 5'-position |
| 10 | CH₃ | H | H | -CON(C₂H₅)-C₆H₃(OCH₃)₂ | 5'-position |
| 11 | CH₃ | H | H | -SO₂N(CH₃)₂ | 5'-position |
| 12 | CH₃ | H | H | -CON(C₂H₅)-C₆H₄-COOH | 5'-position |
| 13 | CH₃ | H | H | H | 5'-position |
| 14 | C₂H₅ | H | H | -CON(C₂H₅)-C₆H₄-COOH | 4'-position |
| 15 | C₃H₇ | H | H | -SO₂N(CH₃)₂ | 4'-position |

-continued

| Compound | R | D³ | D² | D¹ | | CAR¹ |
|---|---|---|---|---|---|---|
| 16 | CH₃ | 5'-Cl | H | H | −CON(C₂H₅)−C₆H₃−NHSO₂CH₃ | 4'-position |
| 17 | CH₂OCH₃ | 4'-SO₂CH₃ | H | H | −CON(C₂H₄OH)−C₆H₄ | 5'-position |
| 18 | CH₂CH₂OH | 5'-COOH | H | H | −CON(CH₃)−C₆H₃−NHSO₂CH₃ | 4'-position |
| 19 | C₆H₅ | 5'-C≡N | H | H | −CON(CH₃)−C₆H₃−NHSO₂CH₃ | 4'-position |
| 20 | p-C₆H₄OCH₃ | 5'-SO₂NHCH₃ | H | H | −CON(CH₃)−C₆H₄ | 4'-position |
| 21 | C₁₀H₂₁ | H | 2-SO₂CH₃ | H | −CON(CH₃)−C₆H₄ | 5'-position |
| 22 | CH₂C₆H₅ | H | H | H | −CON(CH₃)−C₆H₄ | 5'-position |
| 23 | CH₃ | 5'-Br | H | H | −CON(C₂H₅)−C₆H₂(OCH₃)(OCH₃) | 4'-position |

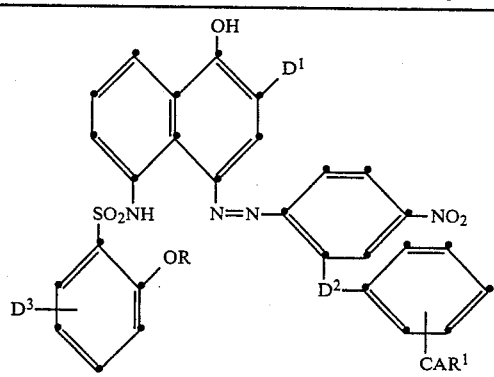

-continued

| Compound | R | $D^3$ | $D^2$ | $D^1$ | $CAR^1$ |
|---|---|---|---|---|---|
| 24 | $C_2H_5$ | H | $-SO_2N(CH_3)-$ | $-CON(CH_3)-$〈phenyl〉$-NHSO_2CH_3$ | 3-position |
| 25 | $CH_3$ | $5'-SO_2NH_2$ | $-SO_2N(CH_3)-$ | $-SO_2N(CH_3)_2$ | 4-position |
| 26 | $CH_3$ | H | $-C(O)-N(CH_3)-$ | $-SO_2N(CH_3)_2$ | 4-position |

Structure: 1-hydroxy-naphthalene bearing $D^1-CAR^1$ at the 2-position, an arylazo group with $D^2$ substituent and para-$NO_2$ at the 4-position, and an $-SO_2NH-$〈phenyl with OR and $D^3$ substituents〉 at the 6-position.

| Compound | R | $D^3$ | $D^2$ | $D^1$ | $CAR^1$ |
|---|---|---|---|---|---|
| 27 | $CH_3$ | $5'-OCH_3$ | $2-SO_2CH_3$ | $-CON(CH_3)-$〈phenyl〉 | 4-position |
| 28 | $CH_3$ | $5'-SO_2NH_2$ | H | $-CON(CH_3)-$〈phenyl〉 | 4-position |
| 29 | $CH(CH_3)_2$ | H | $2-SO_2CH_3$ | $-CON(C_2H_5)-$〈phenyl〉 | 3-position |
| 30 | $CH_3$ | $5'-SO_2NH_2$ | 2-CN | $-CON(CH_3)-$〈phenyl〉 | 4-position |

-continued

| Compound | R | $D^3$ | $D^2$ | $D^1$ | $CAR^1$ |
|---|---|---|---|---|---|
| 31 | $CH_3$ | 5'-$SO_2NH_2$ | 2-$SO_2N(CH_3)_2$ | $-CON(CH_3)_2$ | 4-position |

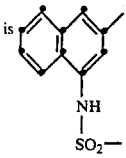

The photographic element described above can be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element or cover sheet, in which case the alkaline solution serves to activate the incorporated developer.

A photographic film unit or assemblage in accordance with this invention is adapted to be processed by an alkaline processing composition, and comprises:
(1) a photographic element as described above; and
(2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition in a film assemblage which can be used in our invention is the liquid spreading means described in Columbus U.S. Pat. No. 4,370,407, issued Jan. 25, 1983.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Patent 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

A preferred photographic assemblage in accordance with the invention comprises:

(a) a photographic element comprising a support having thereon the following layers in sequence: a dye image-receiving layer, a stripping layer, a substantially opaque layer and a photosensitive silver halide emulsion layer having associated therewith a dye image-providing material as described above;

(b) a transparent cover sheet superposed over the silver halide emulsion layer; and (c) an opaque alkaline processing composition and means containing same for discharge, during processing, between the cover sheet and the photosensitive element.

Any material may be employed as the stripping layer in the assemblage described above provided it will perform the desired function of stripping cleanly. Such materials are disclosed, for example, in U.S. Pat. Nos. 3,220,835, 3,730,718 and 3,820,999 and include gum arabic, sodium alginate, pectin, polyvinyl alcohol and hydroxyethyl cellulose. In a preferred embodiment of this invention, hydroxyethyl cellulose is employed as the stripping layer.

The stripping layer materials employed in the assemblage described above can be employed in any amount which is effective for the intended purpose. In general, good results have been obtained at a concentration of from about 5 to about 2000 mg/m$^2$ of element. The particular amount to be employed will vary, of course, depending on the particular stripping layer material employed and the nature of the other layers of the diffusion transfer element.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have the cyan or cyan-forming dye-releaser of the invention associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, catechol compounds, and 3-pyrazolidinone compounds as disclosed in column 16 of U.S. Pat. No. 4,358,527, issued Nov. 9, 1982. A combination of different ETA's, such as those disclosed in U.S. Pat. No. 3,039,869, can also be employed. These ETA's are employed in the liquid processing composition or contained, at least in part, in any layer or layers of the photographic element or film assemblage to be activated by the alkaline processing composition, such as in the silver halide emulsion layers, the dye image-providing material layers, interlayers, image-receiving layer, etc.

In a preferred embodiment of the invention, the silver halide developer or ETA employed becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure,* pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid-and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure,* the disclosure of which is hereby incorporated by reference.

Use of a neutralizing material in certain embodiments of film units of this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure,* the disclosure of which is hereby incorporated by reference.

The alkaline solution-permeable, substantially opaque, light-reflective layer employed in certain embodiments of photographic film units used in this invention is described more fully in the November 1976 edition of *Research Disclosure,* page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure,* the disclosure of which is hereby incorporated by reference. The supports may be either opaque for obtaining a reflection print or clear or semitranslucent for obtaining a transparency. If transparencies are obtained, they may be viewed through the support side or the opposite side depending upon the "viewing" required.

While the invention has been described with reference to layers of silver halide emulsions and dye image-providing materials, dotwise coating, such as would be obtained using a gravure printing technique, could also be employed. In this technique, small dots of blue-, green-, and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure,* Volume 176, Dec. 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

SYNTHESIS EXAMPLE 1

Preparation of Compound 2

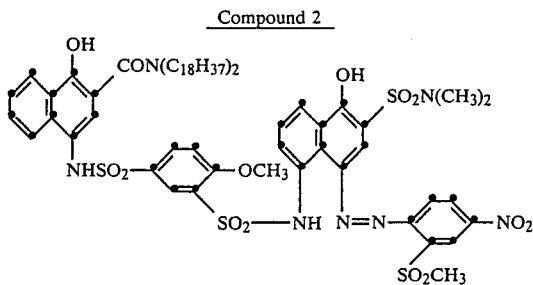

Compound 2

1A. Synthesis of 3-Chlorosulfonyl-4-methoxybenzenesulfonylfluoride Intermediate

Methoxymetanilylfluoride (10.2 g, 50 mmol) was dissolved in dilute hydrochloric acid (400 ml) and filtered to remove a small amount of insoluble material. This solution was cooled to 5° C., and a solution of sodium nitrite (3.45 g, 50. mmol) in water (20 ml) was added. The diazonium solution was stirred for 10 minutes and then was added dropwise to an efficiently stirred solution of sulfur dioxide saturated acetic acid (200 ml) containing cupric chloride dihydrate (4.2 g) dissolved in water (20 ml). The solid which precipitated was collected, washed thoroughly with water and air dried yielding 6.1 g (42%) of product.

1B. Synthesis of 2-Dimethylsulfamoyl-5-(5-fluorosulfonyl-2-methoxy)-phenylsulfonamido-1-naphthol Intermediate 3-Chlorosulfonyl-4-methoxybenzenesulfonylfluoride (4.6 g, 15.9 mmole) as prepared above was dissolved in tetrahydrofuran (20 ml) and was added dropwise to a stirred solution at 0° C. under nitrogen of 5-amino-2-dimethylsulfamoyl-1-naphthol hydrochloride (4.84 g, 15.9 mmol) in anhydrous pyridine (50 ml). The progress of the reaction was followed by thin-layer chromatography and small portions of additional sulfonylchloride were added to the reaction mixture until no aminonaphthol remained. The reaction mixture was poured onto ice-hydrochloric acid and the oily solid that formed was collected. The oil was dissolved in tetrahydrofuran and the small amount of dark solid was filtered and discarded. The tetrahydrofuran was removed under reduced pressure, the residue was dissolved in methanol and poured into ice-water. The resulting solid collected by filtration yielded 6.4 g (78%).

1C. Azo Dye Formation

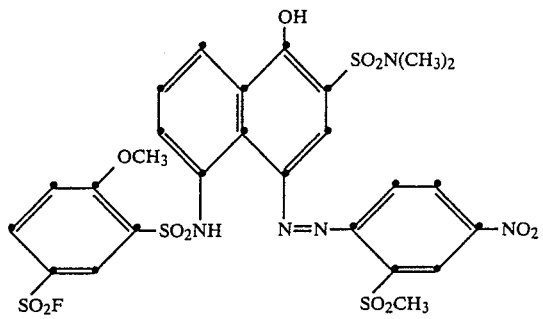

2-Methanesulfonyl-4-nitroaniline (2.67 g, 12.4 mmol) was added to nitrosylsulfuric acid (3.94 g, 40% by weight in 87% sulfuric acid) in concentrated sulfuric acid (15 ml) and stirred until solution was completely dissolved. This solution added with cooling to 'mixed acid' (1:5 propionic:acetic acid) (20 ml), was then added dropwise to a stirred solution of 2-dimethylsulfamoyl-5-(5-fluorosulfonyl-2-methoxy)-1-naphthol (6.4 g, 12.4 mmol) in pyridine (80 ml) and 80 ml of 'mixed acid' cooled to −5° C. The rate of addition was adjusted so as to maintain a temperature <5° C. After addition was complete, the mixture was stirred at 0° C. for one hour and was then poured into dilute hydrochloric acid-ice. The solid was collected, washed well with water, boiled while still damp in acetonitrile, and then allowed to cool to 25° C. The resulting solid dye (as the sulfonyl fluoride) was collected and air dried to yield 7.2 g (78%). Thin-layer chromatography on silica gel with carbontetrachloride:acetic acid (95:5) indicated only one spot.

1D. Synthesis of the Redox Dye Releaser

A suspension of anhydrous sodium carbonate (12 g) in anhydrous dimethylsulfoxide (120 ml) was heated under nitrogen to 95° C. 4-Amino-1-hydroxy-N,N-dioctadecyl-2-naphthamide (6.52 g, 9.4 mmol) and 2-dimethylsulfamoyl-5-(5-fluorosulfonyl-2-methoxybenzenesulfonamido)-4-(2-methanesulfonyl-4-nitrophenylazo)-1-naphthol (7.0 g, 9.4 mmol) were pulverized together and added to the hot dimethylsulfoxide suspension. The progress of the reaction was followed by silica-gel thin-layer chromatography (solvent carbontetrachloride:acetic acid, 95:5); aliquots of the reaction were added to dilute hydrochloric acid and then extracted with ethyl acetate. The sulfonyl fluoride disappeared almost immediately and two new dye spots were formed; more than one hour was required to convert this mixture to one final product. The reaction mixture was filtered while hot, added to acetic acid (300 ml) and allowed to stand under nitrogen at 25° C. overnight. The resulting solid was collected by filtration and recrystallized from acetonitrile to yield 8.6 g. Recrystallization from acetic acid and then acetonitrile yielded 7.4 g of dye (58%).

SYNTHESIS EXAMPLE 2

Preparation of Compound 3

2C. Synthesis of 4'-Ethylamino-methanesulfonanilide Intermediate p-Nitroaniline (100 g, 720 mmol), methanesulfonylchloride (91.2 g, 796 mmol), and pyridine (1000 ml) were stirred at room temperature (22° C.) for 18 hours. The solution was then poured into dilute (1:5) hydrochloric acid (6 l), the resulting precipitate was collected and was washed well with water. The crude product was recrystallized from acetonitrile to yield 144 g (92.5%) of 4-nitromethanesulfonanilide.

The nitro compound (21.6 g, 100 mmol) as prepared above was dissolved in tetrahydrofuran (200 ml) and acetic acid (20 ml), and hydrogenated at 40 psi for two hours using a 10% palladium on carbon catalyst. The catalyst was then filtered off, acetic anhydride (20 ml, 350 mmol) was added and the mixture was stirred for 30 minutes at room temperature (22° C.) to precipitate the product. The precipitate was filtered off and washed with ethyl ether to yield 14.4 g (63.2%) of 4'-acetamidomethanesulfonanilide.

The acetamido compound as prepared above (14.4 g, 63 mmole) was added in small portions to borane hydridetetrahydrofuran (158 ml, 158 mmole), cooled initially to below 10° C. and maintained below 20° C. throughout the addition. The reaction mixture was then warmed to room temperature and then refluxed for 90 minutes. After cooling to room temperature, methanol (50 ml) was carefully added and the mixture was again refluxed for one hour. The solvents were removed under reduced pressure and the resulting solid was recrystallized from isopropyl alcohol to yield 9.8 g (72.6%) of product.

Compound 3

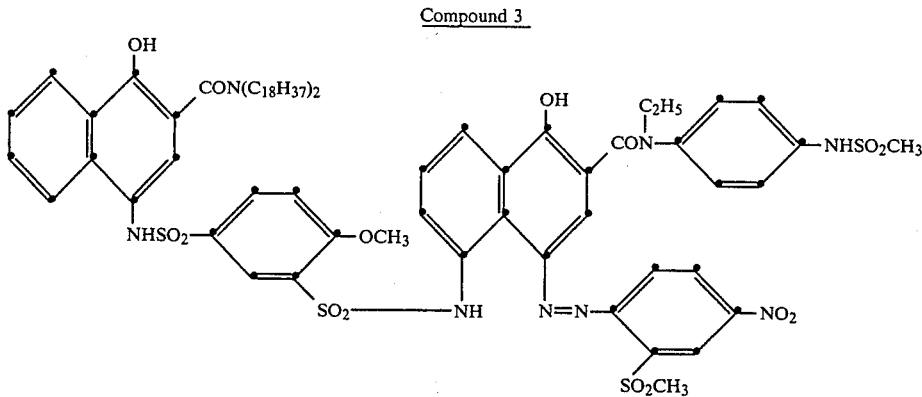

2A. Synthesis of 5-(5-Fluorosulfonyl-2-methoxybenzenesulfonamido)-1-hydroxy-2-naphthoic acid Intermediate 5-Amino-1-hydroxy-2-naphthoic acid (10.2 g, 50 mmol) and 3-chlorosulfonyl-4-methoxybenzenesulfonylfluoride (14.4 g, 50 mmol) as prepared as in 1A were suspended in N,N-dimethylacetamide (100 ml). N,N-Dimethylaniline (15.1 g, 125 mmol) was added, the mixture was stirred at room temperature (22° C.) for 16 hours, and was then poured into ice water (750 ml) acidified with concentrated hydrochloric acid (25 ml). The mixture was extracted with three portions of ethyl acetate (500 ml each). The combined extracts were dried over anhydrous magnesium sulfate, the salts were removed by filtration, and the filtrate was decolorized with acidic alumina. The alumina was separated and the solvent was removed under reduced pressure to yield 8.3 g, (36.4%) of product.

2B. Conversion to 5-(5-Fluorosulfonyl-2-methoxybenzenesulfonamido)-1-hydroxy-2-naphthoyl chloride Intermediate The carboxylic acid, as prepared in 2A (163 g, 357 mmol), was suspended in ethyl acetate (3000 ml). Thionyl chloride (260 ml, 3.6 mol) and N,N-dimethylformamide (3 ml) were added and the reaction mixture was stirred at room temperature (22° C.) for 16 hours. Ligroin (2000 ml) was added and the resulting precipitate was collected by filtration, washed with ligroin and air-dried to yield 137 g (80.9%) of acyl chloride product.

2D. Synthesis of 5-(5-Fluorosulfonyl-2-methoxybenzenesulfonamido)-1-hydroxy-2-[N-ethyl-N-(4-methanesulfonamidophenyl)-]naphthamide Intermediate The acyl chloride, as prepared in 2B (21.7 g, 46 mmol), and the amine, as prepared in 2C (9.8 g, 46 mmol), were dissolved in tetrahydrofuran (200 ml). N,N-dimethylaniline (13.9 g, 115 mmol) was added, the mixture was stirred for 16 hours at room temperature (22° C.), and was then poured into ice water (500 ml) acidified with concentrated hydrochloric acid (15 ml). The mixture was extracted with three portions of ethyl acetate (300 ml each). The combined extracts were dried over anhydrous magnesium sulfate, the salts were removed by filtration and the solvent was removed under reduced pressure. The resulting glassy solid was triturated with methanol (150 ml) and the resulting crystalline solid was collected to yield 16.3 g (54.3%) of product.

2E. Azo Dye Formation

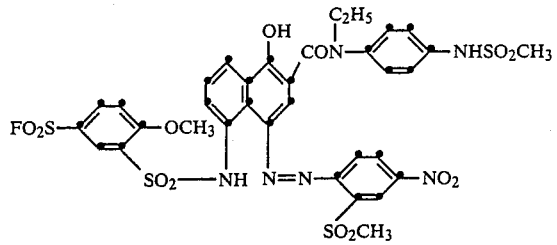

The intermediate, 2D (16.3 g, 25 mmol), was dissolved in tetrahydrofuran (160 ml) and acetic acid (320 ml). Sodium acetate (6.2 g, 75 mmol) was dissolved in water (65 ml) and added to the tetrahydrofuran mixture. 2-Methanesulfonyl-4-nitrobenzenediazonium tetrafluoroborate (8.7 g, 27.5 mmole) was then added in portions to this mixture maintaining the temperature below 20° C. The reaction mixture was stirred for 16 hours at room temperature (22° C.) to precipitate the dye. The dye precipitate was filtered, washed well with water, and dried in a vacuum oven at 60° C. to yield 12.5 g (56.8%) product. (Note: The dye can be converted to the sulfonamide form by treatment with ammonia).

2F. Synthesis of The Redox Dye Releaser

Sodium bicarbonate (5.9 g, 70 mmol) was suspended in anhydrous dimethylsulfoxide (100 ml) and heated to 130° C. A blended mixture of the solid dye sulfonyl fluoride, prepared in 2E (12.5 g, 14 mmol), and solid 4-amino-1-hydroxy-N,N-dioctadecyl-2-naphthamide (11.1 g, 16 mmol) was added in a single portion to the hot dimethylsulfoxide suspension and stirred for 45 minutes. The mixture was then poured into dilute acetic acid (1000 ml acid plus 500 ml water). The resulting precipitate was filtered and washed with 2% hydrochloric acid.

The product was purified by chromatography on Woelm silica gel using a mixture of acetonitrile:acetic acid:toluene (10:2:88) as an eluant. Appropriate fractions were collected and combined, the solvents were removed under reduced pressure to yield 5.3 g (24.2%) of product.

SYNTHESIS EXAMPLE 3

Preparation of Compound 4

Compound 4

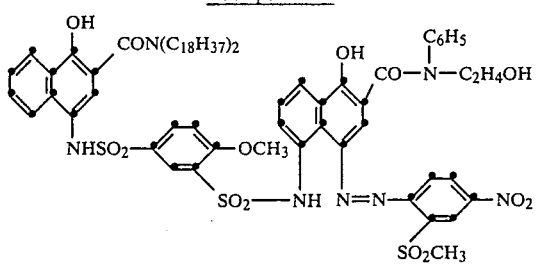

3A. Synthesis of 2-Anilinoethyl Acetate Hydro-chloride Intermediate

2-Anilinoethanol (137 g, 1.0 mol) was mixed with acetonitrile (300 ml) and concentrated hydrochloric acid (100 ml), and the reaction mixture was evaporated to dryness. The residue was dissolved in acetonitrile (1000 ml); acetyl chloride (89 ml, 1.25 mol) was added and the reaction mixture was stirred at room temperature (22° C.) for 16 hours. The mixture was evaporated to dryness under reduced pressure and the resulting solid was triturated with ethyl ether (1000 ml). The solid was removed by filtration and dried to yield 197 g (91.3%) of product.

3B. Synthesis of 5-(5-Fluorosulfonyl-2-methoxy-benzenesulfonamido)-1-hydroxy-2-(N-phenyl-N-acetoxyethyl)naphthamide Intermediate The acyl chloride, as prepared in 2B (30.1 g, 64 mmol) and the aniline hydrochloride, as prepared in 3A (13.7 g, 64 mmol), were suspended in tetrahydrofuran (300 ml). N,N-Dimethylaniline (27.1 g, 224 mmol) was added, the reaction mixture was stirred for 16 hours at room temperature (22° C.), and was then poured into ice water (1500 ml) acidified with concentrated hydrochloric acid (8 ml). The mixture was extracted with three portions of ethyl acetate (750 ml each). The combined extracts were dried over anhydrous magnesium sulfate, the salts were removed by filtration and the solvent removed under reduced pressure.

The crude product was purified by chromatography on Woelm silica gel using a mixture of acetonitrile:toluene (10:90) as an eluant. Appropriate fractions were collected and combined, the solvents were removed under reduced pressure to yield 14.7 g (37.2%) product.

3C. Azo Dye Formation

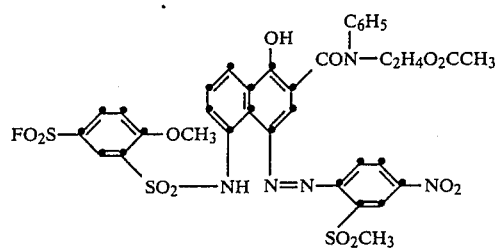

The disubstituted naphthamide, 3B (14.7 g, 24 mmol), was dissolved in tetrahydrofuran (150 ml) and acetic acid (300 ml). Sodium acetate (5.9 g, 72 mmol) was dissolved in water (150 ml) and added to the tetrahydrofuran mixture. 2-Methanesulfonyl-4-nitrobenzenediazonium tetrafluoroborate (8.2 g, 26 mmol) was then added in portions to this mixture maintaining the temperature below 20° C. The reaction mixture was stirred 16 hours at room temperature (22° C.). Water (50 ml) was then added and the mixture was cooled to precipitate the dye. The dye precipitate was filtered, washed well with water, and air dried in a vacuum oven at 60° C. to yield 15.9 g (78.3%) product.

3D. Synthesis of The Redox Dye Releaser (and Conversion to the N-hydroxyethyl Form)

Sodium bicarbonate (8.0 g, 95 mmol) was suspended in anhydrous dimethylsulfoxide (150 ml) and heated to 130° C. A blended mixture of solid dye sulfonyl fluoride, prepared in 3C (15.9 g, 19 mmol) and solid 4-amino-1-hydroxy-N,N-dioctadecyl-2-naphthamide (14.7 g, 21 mmol) was added in a single portion to the hot dimethylsulfoxide suspension and stirred for 45 minutes. The reaction mixture was then poured into dilute acetic acid (1500 ml acid plus 750 ml water). The resulting precipitate was filtered, washed with water, and air dried.

The product was purified by chromatography as described in 2F to yield 6.5 g (22.3%) of product. The above purified 'blocked' RDR (5.0 g, 3 mmol) was dissolved in anhydrous methanol (50 ml) and tetrahydrofuran (5 ml). Concentrated sulfuric acid (0.5 ml) was then added and the reaction mixture was stirred at room temperature (22° C.) for 20 hours. The reaction mixture was then poured into water (500 ml) and the resulting precipitate was collected by filtration.

The crude product was purified by chromatography as described in 3B (except the acetonitrile:toluene eluant ratio was 25:75) to yield 2.5 g (56%) product.

EXAMPLE 1

Light Fading Test

The comparative light fading of various cyan azo dyes of the invention (without a CAR moiety) and for various control and comparison dyes was conveniently measured by solution studies that estimate a bimolecular rate constant for reaction of the dye and singlet oxygen. The concept of this evaluation has been summarized in: J. Griffiths, *Developments in Polymer Photochemistry*, Vol. 1, Chapter 6, Applied Science Publishers, Ltd., London, 1980, and P. B. Merkel and W. F. Smith, Jr., *J. Phys. Chem.*, 83, p. 2834 (1979). A methanol solution $10^{-2}$ mM in cyan azo dye and $4 \times 10^{-3}$ mM in Rose Bengal as a sensitizer was prepared. The sensitizer generated singlet oxygen by energy transfer to ground state oxygen with a known efficiency when intermittently irradiated with 545 nm monochromatic light of known intensity. The fading rate constant for bleaching of azo dye by reaction with singlet oxygen was calculated from established equations (listed as $k_{ox} \times 10^6$ ($M^{-1}sec^{-}$)). The following results were obtained:

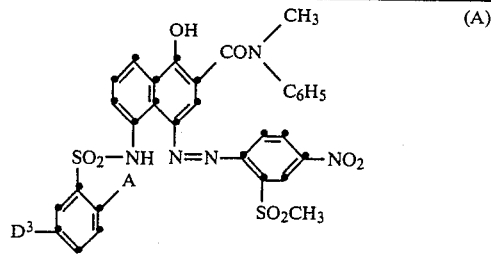

(A)

| Dye | $D^3$ | A | Fading Rate Constant $k_{ox} \times 10^6$ ($M^{-1}$ $sec^{-1}$) |
|---|---|---|---|
| Released Dye from Cmpd. 8 | $SO_2NH_2$ | $OCH_3$ | 0.9 |
| Released Dye from Cmpd. 9 | $SO_2NH_2$ | $OCH(CH_3)_2$ | 0.7 |
| Control | H | H | 1.9 |
| Comparison | $SO_2NH_2$ | Cl | 1.2 |
| Comparison | H | $CH_3$ | 1.6 |
| Comparison | H | OH | 1.6 |
| Comparison | H | $NH_2$ | 1.6 |
| Comparison | H | $N(CH_3)_2$ | 4.5 |
| Comparsion | H | NH(CHO) | 1.8 |

-continued (A)

| Dye | $D^3$ | A | Fading Rate Constant $k_{ox} \times 10^6$ ($M^{-1}$ $sec^{-1}$) |
|---|---|---|---|
| Comparison | H | $NO_2$ | 2.5 |

The above data indicate that the fading rate constant for dyes according to the invention with a 2'-alkoxy substituent on the 5-benzenesulfonamido group was much less than the control dye with no substituent in the 2'-position or the comparison dyes with various other substituents in the 2'-position.

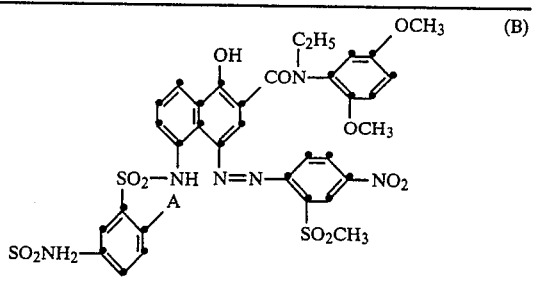

(B)

| Dye | A | Fading Rate Constant $k_{ox} \times 10^6$ ($M^{-1}$ $sec^{-1}$) |
|---|---|---|
| Released Dye from Cmpd. 10 | $OCH_3$ | 0.9 |
| Control | H | 2.2 |

The above data again indicate that the fading rate constant for a dye according to the invention with a 2'-methoxy substituent on the 5-benzenesulfonamido group was much less than the control dye with no substituent in the 2'-position.

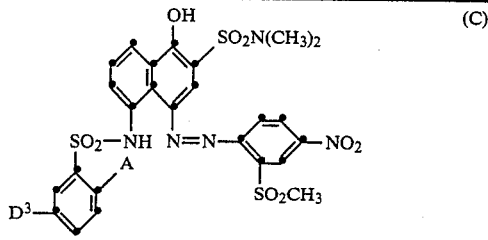

(C)

| Dye | $D^3$ | A | Fading Rate Constant $k_{ox} \times 10^6$ ($M^{-1}$ $sec^{-1}$) |
|---|---|---|---|
| Released Dye From Cmpd. 11 | H | $OCH_3$ | 0.8 |
| Control | H | H | 3.0 |
| Comparison | $OCH_3$ | H | 2.6 |

(The solvent used to obtain the data in this section was dimethylformamide rather than methanol.)

The above data again indicate that the fading rate constant for a dye according to the invention with a 2'-methoxy substituent on the 5-benzenesulfonamido group was much less than the control dye with no substituent in the 2'-position or the comparison dye with a methoxy group in the 5'-position.

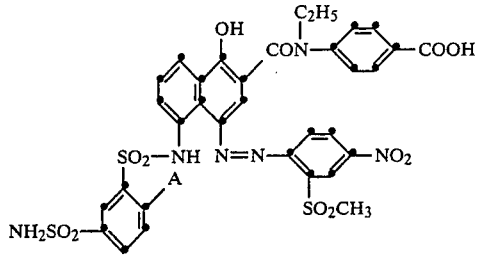

| Dye | A | Fading Rate Constant $k_{ox} \times 10^6$ (M$^{-1}$ sec$^{-1}$) |
|---|---|---|
| Released Dye from Cmpd. 12 | OCH$_3$ | 0.9 |
| Control | H | 2.3 |

The above data again indicate that the fading rate constant for a dye according to the invention with a 2'-methoxy substituent on the 5-benzenesulfonamido group was much less than the control dye with no substituent in the 2'-position.

(E)

[Structure with OH, SO$_2$-NH, N=N, NO$_2$, SO$_2$CH$_3$, NH$_2$SO$_2$, A]

| Dye | A | Fading Rate Constant $k_{ox} \times 10^6$ (M$^{-1}$ sec$^{-1}$) |
|---|---|---|
| Released Dye from Cmpd. 13 | OCH$_3$ | 2.3 |
| Control | H | 4.6 |

The above data again indicate that the fading rate constant for a dye according to the invention with a 2'-methoxy substituent on the 5-benzenesulfonamido group was much less than the control dye with no substituent in the 2'-position.

EXAMPLE 2

Light Fading on Mordants

The light fading of various cyan azo dyes of the invention (without a CAR moiety) and for various control dyes was evaluated on a mordant, such as would be used for an image transfer receiver.

0.0375 mmole of dye was dissolved in 5 ml of 0.125M potassium hydroxide. To this solution was added 10 ml of a mixture consisting of 15.8 g carboxymethylcellulose, 13.5 g potassium hydroxide and 350 ml water. The final dye concentration in this mixture was 0.0025M.

Two different mordant-receiver sheets were prepared by coating each of the following on a transparent poly(ethylene terephthalate) film support:

M-1: poly(styrene-co-1-vinylimidazole-co-3-benzyl-1-vinylimidazolium chloride) (50:40:10 mole ratio) (2.3 g/m$^2$), gelatin (2.3 g/m$^2$)

M-2 poly(styrene-co-N-benzyl-N,N-dimethyl-N-vinylbenzylammonium chloride-co-divinylbenzene) (49:49:2 mole ratio) (2.3 g/m$^2$), gelatin (2.3 g/m$^2$)

The viscous dye mixture was spread between a transparent poly(ethylene terephthalate) cover sheet and the mordant-receiver sheet using a pair of juxtaposed rollers to provide a fluid gap of 100 μm. The dye was allowed to transfer to the mordant sheet for 5 minutes. The cover sheet was then separated and discarded. The mordant-receiver was then washed in water for 5 minutes. The initial transmission density was recorded. The mordant sheet was then placed against a white reflective sheet, and exposed through a Wratten 2C filter to 2 weeks, 5.4 kLux simulated daylight (filtered Xenon) 24° C., 45 percent RH, after which the transmission density was read again. The dye loss per day was calculated as a percentage from the difference between the original density and the density after the fading test. The following results were obtained:

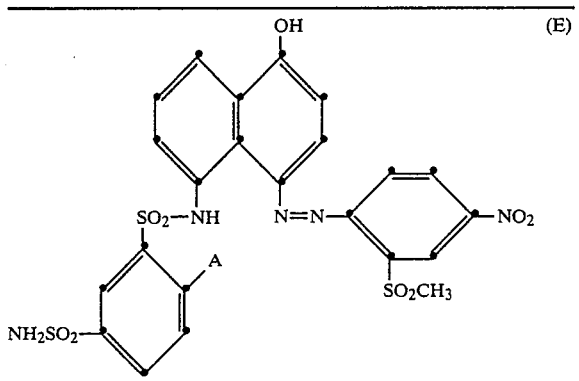

| | | | Percent Dye Fade/Day | |
|---|---|---|---|---|
| Dye | D$^1$ | A | Mordant M-1 | Mordant M-2 |
| Released dye from Cmpd. 10 | CON(C$_2$H$_5$)-[ring with OCH$_3$, OCH$_3$] | OCH$_3$ | 0.7 | 0.7 |
| Control | CON(C$_2$H$_5$)-[ring with OCH$_3$, OCH$_3$] | H | 1.0 | 1.3 |
| Released dye from Cmpd. 12 | CON(C$_2$H$_5$)-[ring with COOH] | OCH$_3$ | 0.5 | 0.7 |

-continued

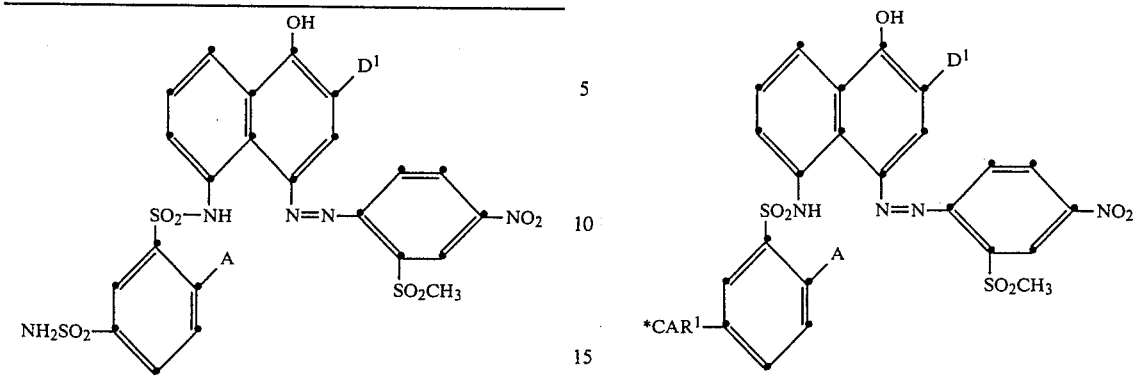

| Dye | D¹ | A | Percent Dye Fade/Day Mordant M-1 | Mordant M-2 |
|---|---|---|---|---|
| Control | $-CON\diagdown_{C_2H_5}^{\phantom{C_2H_5}}$ —COOH | H | 0.9 | 1.1 |
| Released dye from Cmpd. 13 | H | $OCH_3$ | 0.9 | 1.7 |
| Control | H | H | 1.5 | 2.3 |

The above data indicate that regardless of which mordant was used, the dyes according to the invention with a 2'-methoxy substituent on the 5-benzenesulfonamido group faded much less than the corresponding control dyes with no substituent in the 2'-position.

EXAMPLE 3

Photographic Test

Various dye-releasing compounds of the invention were evaluated for dye stability in a peel-apart image transfer format.

A light-sensitive donor element was prepared similar to that of Example 3 of Snow and Klein U.S. application Ser. No. 511,425, filed July 6, 1983, except that layers 4 and 13 were omitted, and using the cyan dye-releasers listed in the Table below.

A receiving element and activator solution were prepared similar to those described in Example 1 of Bishop U.S. Pat. No. 4,298,682.

A sample of each donor element was exposed in a sensitometer through a step tablet to yield a near neutral at a Status A density of 0.8, soaked in the activator solution described above in a shallowtray processor for 15 seconds at 28° C. (82.5° F.) and then laminated between nip rollers to a sample of the receiving element described above. After ten minutes at room temperature, 22° C. (72° F.), the donor and receiver were peeled apart.

The Status A red, green and blue density curves were obtained by a computer integration of the individual step densities on the receiver. The receiver was then incubated under (1) "HID (High Intensity Daylight) fade" conditions, (2 weeks, 50 κLux, 5400° K., 32° C., approximately 25 percent RH) and (2) "HH (High Humidity) fade" conditions (6 weeks, 54 κLux, cool-white fluorescent, 29° C., 84 percent RH). The curves were then again obtained. The loss in density, ΔD, from an original density of 1.6 was calculated. The following results were obtained:

| Compound | D¹ | A | Dye Loss Upon Incubation (ΔD) HID | HH |
|---|---|---|---|---|
| 1 | $-CON\diagdown_{C_2H_5}^{\phantom{C_2H_5}}$ —COOH | $OCH_3$ | −0.16 | −0.07 |
| 2 | $-SO_2N(CH_3)_2$ | $OCH_3$ | −0.17 | −0.05 |
| 3 | $-CON\diagdown_{C_2H_5}^{\phantom{C_2H_5}}$ —NHSO₂CH₃ | $OCH_3$ | −0.20 | −0.06 |
| 4 | $-CON\diagdown_{C_2H_4OH}^{\phantom{C_2H_4OH}}$ | $OCH_3$ | −0.21 | −0.06 |
| 5 | $-CON\diagdown_{CH_3}^{\phantom{CH_3}}$ NHSO₂CH₃ | $OCH_3$ | −0.12 | −0.05 |
| 6 | $-CON\diagdown_{CH_3}^{\phantom{CH_3}}$ NHSO₂CH₃ | $OCH_3$ | −0.16 | −0.08 |
| Control | $-CON\diagdown_{C_2H_5}^{\phantom{C_2H_5}}$ —COOH | H | −0.19 | −0.17 |

*Shown in list of compounds above.

The above data indicate that the dyes according to the invention with a 2'-methoxy substituent on the 5-benzenesulfonamido group gave improved light stability than the corresponding control dyes with no substituent in the 2'-position.

The invention has been described in detail with particular reference to preferred embodiments thereof, but it will be understood that variations and modifications can be effected within the spirit and scope of the invention.

What is claimed is:

1. In a photographic element comprising a support having thereon at least one photosensitive silver halide emulsion layer, said emulsion layer having associated therewith a dye imageproviding material, the improvement wherein said dye image-providing material is a nondiffusible compound capable of releasing at least one diffusible cyan dye moiety, said compound having the formula:

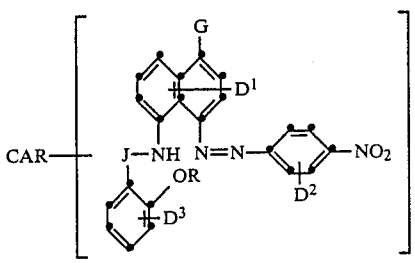

wherein:
(a) J represents $SO_2$ or CO,
(b) R represents a substituted or unsubstituted alkyl group of from 1 to about 10 carbon atoms or a substituted or unsubstituted aryl group of from 6 to about 12 carbon atoms,
(c) G represents a hydroxy group, a salt thereof, or a hydrolyzable precursor thereof,
(d) CAR represents a ballasted carrier moiety capable of releasing said diffusible dye moiety as a function of development of said silver halide emulsion layer under alkaline conditions, and
(e) $D^1$, $D^2$, and $D^3$ each independently represents H or one or more electron-withdrawing groups selected from $-SO_2Y^1$, $-CONY^1Y^2$, $-Cl$, $-COY^1$, $-C\equiv N$ and $-SO_2NY^1Y^2$, where $Y^1$ and $Y^2$ each independently represents hydrogen, a substituted or unsubstituted alkyl group of from 1 to about 10 carbon atoms or a substituted or unsubstituted aryl group of from 6 to about 12 carbon atoms.

2. The photographic element of claim 1 wherein J represents $SO_2$, R represents an alkyl group of from 1 to about 10 carbon atoms and G represents hydroxy.

3. The photographic element of claim 2 wherein: $D^1$ is H, $-CON(CH_3)(C_6H_5)$,

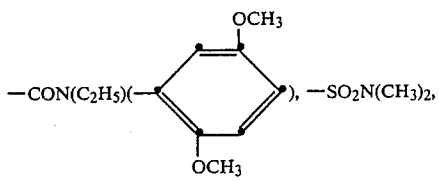

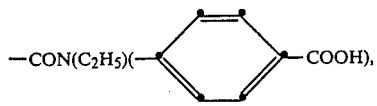

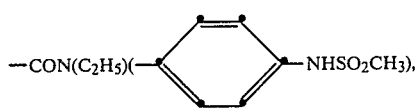

$-CON(C_2H_4OH)(C_6H_5)$, or

$D^2$ is $SO_2CH_3$ in the 2-position, and
$D^3$ is H or $SO_2NH_2$ in the 5'-position.

4. The photographic element of claim 2 wherein R is methyl.

5. The photographic element of claim 4 wherein:
$D^1$ is $-SO_2N(CH_3)_2$, $-CON(C_2H_4OH)(C_6H_5)$ or

in the 2-position,
$D^2$ is $SO_2CH_3$ in the 2-position, and
$D^3$ is $SO_2NH_2$ in the 5'-position.

6. The photographic element of claim 1 wherein CAR is a group having the formula:

(Ballast—Carrier—Link)— wherein:
(a) Ballast is an organic ballasting radical of such molecular size and configuration as to render said compound nondiffusible in said photographic element during development in an alkaline processing composition,
(b) Carrier is an oxidizable acyclic, carbocyclic or heterocyclic moiety, and
(c) Link represents a group which, upon oxidation of said carrier moiety, is capable of being hydrolytically cleaved to release said diffusible dye.

7. The photographic element of claim 6 wherein the carrier moiety contains atoms according to the following configuration:

a—(—C=C)$_b$— wherein:
b is a positive integer of 1 to 2, and
a represents the radicals OH, SH, NH—, or hydrolyzable precursors thereof.

8. The photographic element of claim 1 wherein CAR is a group having the formula:

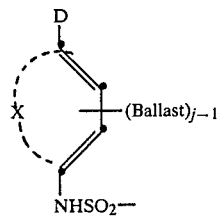

wherein:
(a) Ballast is an organic ballasting radical of such molecular size and configuration as to render said compound nondiffusible in said photographic element during development in an alkaline processing composition,
(b) D is $OR^1$ or $NHR^2$ wherein $R^1$ is hydrogen or a hydrolyzable moiety and $R^2$ is hydrogen or a substituted or unsubstituted alkyl group of 1 to 22 carbon atoms,
(c) X represents the atoms necessary to complete a benzene nucleus, a naphthalene nucleus, or a 5 to 7 membered heterocyclic ring, and
(d) j is a positive integer of 1 to 2 and is 2 when D is $OR^1$ or when $R^2$ is hydrogen or an alkyl group of less than 8 carbon atoms.

9. The photographic element of claim 8 wherein D is OH, j is 2 and X is a naphthalene nucleus.

10. The photographic element of claim 1 wherein said diffusible cyan dye moiety is released from said nondiffusible compound as an inverse function of said development of said silver halide emulsion layer under alkaline conditions.

11. The photographic element of claim 10 wherein said ballasted carrier moiety is a group having the formula:

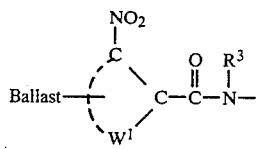

wherein:

Ballast is an organic ballasting radical of such molecular size and configuration as to render said compound nondiffusible in said photographic element during development in an alkaline processing composition, $W^1$ represents at least the atoms necessary to complete a benzene nucleus, and $R^3$ is an alkyl radical having 1 to about 4 carbon atoms.

12. The photographic element of claim 10 wherein said ballasted carrier moiety is a group having the formula:

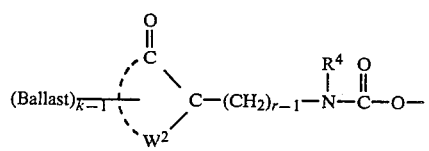

wherein:

Ballast is an organic ballasting radical of such molecular size and configuration as to render said compound nondiffusible in said photographic element during development in an alkaline processing composition, $W^2$ represents at least the atoms necessary to complete a quinone nucleus, r is a positive integer of 1 or 2, $R^4$ is an alkyl radical having 1 to about 40 carbon atoms or an aryl radical having 6 to about 40 carbon atoms, and k is a positive integer of 1 to 2 and is 2 when $R^4$ is a radical of less than 8 carbon atoms.

13. The photographic element of claim 10 wherein said ballasted carrier moiety is a group having the formula:

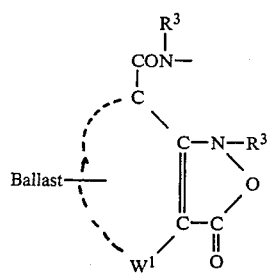

wherein:

Ballast is an organic ballasting radical of such molecular size and configuration as to render said compound nondiffusible in said photographic element during development in an alkaline processing composition, $W^1$ represents at least the atoms necessary to complete a benzene nucleus, and $R^3$ is an alkyl radical having 1 to about 4 carbon atoms.

14. The photographic element of claim 10 wherein said ballasted carrier moiety is a group having the formula:

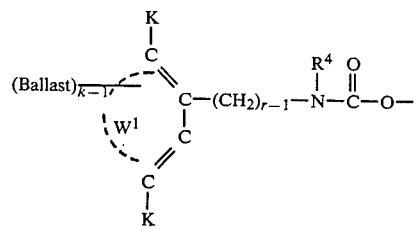

wherein:

Ballast is an organic ballasting radical of such molecular size and configuration as to render said compound nondiffusible in said photographic element during development in an alkaline processing composition, $W^1$ represents at least the atoms necessary to complete a benzene nucleus, r is a positive integer of 1 or 2, $R^4$ is an alkyl radical having 1 to about 40 carbon atoms or an aryl radical having 6 to about 40 carbon atoms, k is a positive integer of 1 to 2 and is 2 when $R^4$ is a radical of less than 8 carbon atoms, and K is OH or a hydrolyzable precursor thereof.

15. The photographic element of claim 1 wherein said nondiffusible compound is:

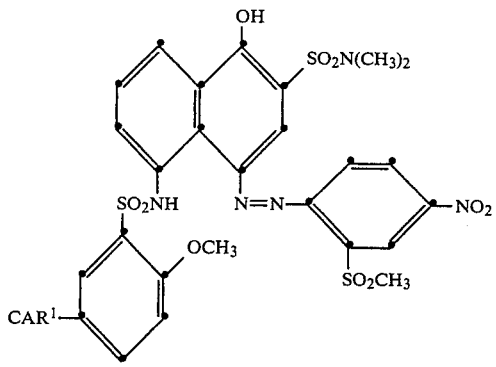

wherein $CAR^1$ is

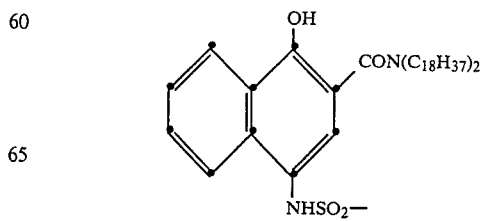

16. The photographic element of claim 1 wherein said nondiffusible compound is:

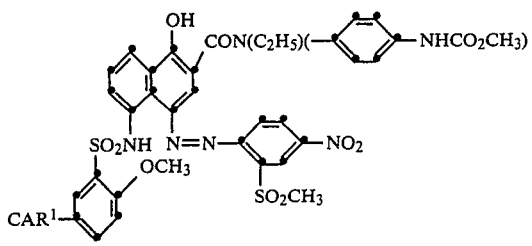

wherein CAR¹ is

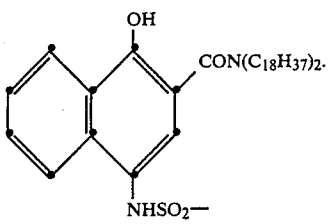

17. The photographic element of claim 1 wherein said nondiffusible compound is:

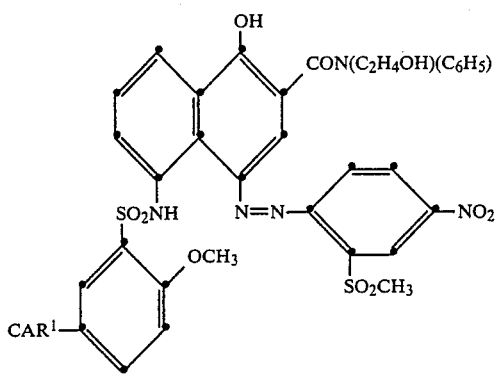

wherein CAR¹ is

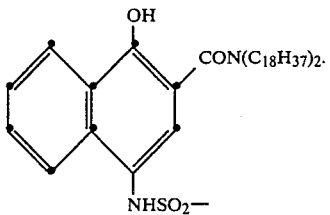

18. In a photographic assemblage comprising:
(a) a photographic element comprising a support having thereon the following layers in sequence: a dye image-receiving layer, a stripping layer, a substantially opaque layer and a photosensitive silver halide emulsion layer having associated therewith a dye image-providing material,
(b) a transparent cover sheet superposed over said silver halide emulsion layer, and
(c) an opaque alkaline processing composition and means containing same for discharge, during processing, between said cover sheet and said photosensitive element, the improvement wherein said dye image-providing material is a nondiffusible compound capable of releasing at least one diffusible cyan dye moiety, said compound having the formula:

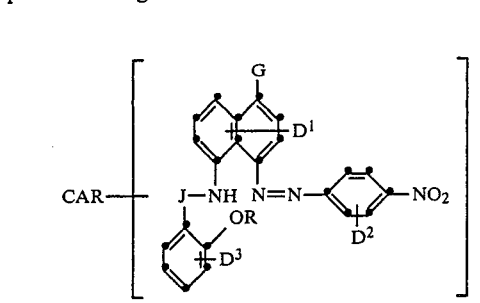

wherein:
(a) J represents $SO_2$ or CO,
(b) R represents a substituted or unsubstituted alkyl group of from 1 to about 10 carbon atoms or a substituted or unsubstituted aryl group of from 6 to about 12 carbon atoms,
(c) G represents a hydroxy group, a salt thereof, or a hydrolyzable precursor thereof,
(d) CAR represents a ballasted carrier moiety capable of releasing said diffusible dye moiety as a function of development of said silver halide emulsion layer under alkaline conditions, and
(e) $D^1$, $D^2$, and $D^3$ each independently represents H or one or more electron-withdrawing groups selected from $-SO_2Y^1$, $-CONY^1Y^2$, $-Cl$, $-COY^1$, $-C\equiv N$ and $-SO_2NY^1Y^2$, where $Y^1$ and $Y^2$ each independently represents hydrogen, a substituted or unsubstituted alkyl group of from 1 to about 10 carbon atoms or a substituted or unsubstituted aryl group of from 6 to about 12 carbon atoms.

19. The assemblage of claim 18 wherein said support is transparent.

20. The assemblage of claim 18 wherein J represents $SO_2$, R represents an alkyl group of from 1 to about 10 carbon atoms and G represents hydroxy.

21. The assemblage of claim 20 wherein:
$D^1$ is H, $-CON(CH_3)(C_6H_5)$,

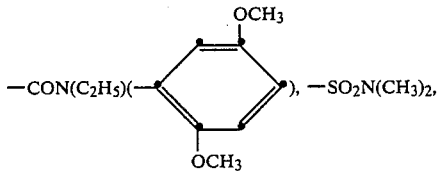

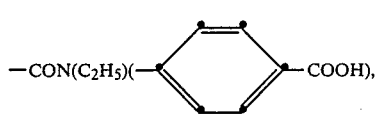

$-CON(C_2H_4OH)(C_6H_5)$, or

-continued
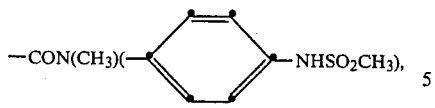
$D^2$ is $SO_2CH_3$ in the 2-position, and
$D^3$ H or $SO_2NH_2$ in the 5'-position.
22. The assemblage of claim 20 wherein R is methyl.
23. The assemblage of claim 22 wherein:
$D^1$ is $-SO_2N(CH_3)_2$, $-CON(C_2H_4OH)(C_6H_5)$ or
in the 2-position,
$D^2$ is $SO_2CH_3$ in the 2-position, and
$D^3$ is $SO_2NH_2$ in the 5'-position.
* * * * *